(12) United States Patent
Wang et al.

(10) Patent No.: US 10,229,308 B2
(45) Date of Patent: Mar. 12, 2019

(54) TEXTURE RECOGNITION DISPLAY DEVICE AND DRIVING METHOD THEREOF

(71) Applicant: BOE TECHNOLOGY GROUP CO., LTD., Beijing (CN)

(72) Inventors: Pengpeng Wang, Beijing (CN); Xue Dong, Beijing (CN); Jing Lv, Beijing (CN); Haisheng Wang, Beijing (CN); Xiaoliang Ding, Beijing (CN); Yingming Liu, Beijing (CN); Wei Liu, Beijing (CN); Yanling Han, Beijing (CN); Xueyou Cao, Beijing (CN); Ping Zhang, Beijing (CN); Changfeng Li, Beijing (CN); Yanan Jia, Beijing (CN); Yuzhen Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/736,796

(22) PCT Filed: Jun. 26, 2017

(86) PCT No.: PCT/CN2017/089999
§ 371 (c)(1),
(2) Date: Dec. 15, 2017

(87) PCT Pub. No.: WO2018/032878
PCT Pub. Date: Feb. 22, 2018

(65) Prior Publication Data
US 2018/0365473 A1     Dec. 20, 2018

(30) Foreign Application Priority Data
Aug. 15, 2016   (CN) .......................... 2016 1 0670872

(51) Int. Cl.
*G06K 9/00*     (2006.01)
*G09G 3/34*     (2006.01)
(Continued)

(52) U.S. Cl.
CPC .......... *G06K 9/0008* (2013.01); *G06K 9/0004* (2013.01); *G09G 3/3208* (2013.01); *G09G 3/3426* (2013.01); *G09G 5/10* (2013.01)

(58) Field of Classification Search
CPC ........... G06K 9/00006–9/0012; G06K 9/0004; G09G 3/3208; G09G 3/3426; G09G 5/10
See application file for complete search history.

(56) References Cited

U.S. PATENT DOCUMENTS

2001/0033254 A1* 10/2001 Furusato ............... G06F 3/0414
                                                              345/55
2009/0206848 A1   8/2009 Chuang et al.
(Continued)

FOREIGN PATENT DOCUMENTS

CN        104598893 A      5/2015
CN        104932743 A      9/2015
(Continued)

OTHER PUBLICATIONS

Search Report for International Patent Application No. PCT/CN2017/089999 dated Sep. 27, 2017.
(Continued)

*Primary Examiner* — Sean T Motsinger
(74) *Attorney, Agent, or Firm* — Calfee, Halter & Griswold LLP

(57) ABSTRACT

Disclosed are a texture recognition display device and a driving method. The texture recognition display device includes a plurality of first control signal lines and second control signal lines disposed in pairs. During a texture recognition period, the second control signal lines are loaded
(Continued)

with a second control signal, the frequency of which is the same as that of a first control signal of the first control signal lines and the phase of which differs from that of the first control signal by 180 degrees. Thus, the noise interference of the first control signal of the first control signal line with a recognition output line may be counteracted, the signal-to-noise ratio of an obtained texture recognition signal can be improved, thereby improving the extraction precision of the texture recognition signal and detection precision.

15 Claims, 7 Drawing Sheets

(51) Int. Cl.
*G09G 3/3208* (2016.01)
*G09G 5/10* (2006.01)

(56) References Cited

U.S. PATENT DOCUMENTS

| | | | | |
|---|---|---|---|---|
| 2010/0098303 | A1* | 4/2010 | Chen | G06K 9/0002 382/124 |
| 2013/0100173 | A1* | 4/2013 | Chaji | G09G 5/10 345/690 |
| 2013/0169702 | A1* | 7/2013 | Ono | G09G 5/10 345/690 |
| 2016/0148034 | A1* | 5/2016 | Kremin | G06K 9/0002 382/124 |
| 2016/0188951 | A1 | 6/2016 | Benkley, III | |
| 2017/0102589 | A1* | 4/2017 | Yang | G02F 1/133621 |
| 2017/0161538 | A1 | 6/2017 | Liu et al. | |
| 2017/0301286 | A1* | 10/2017 | Xiang | G09G 3/3208 |

FOREIGN PATENT DOCUMENTS

| | | |
|---|---|---|
| CN | 105095874 A | 11/2015 |
| CN | 105448247 A | 3/2016 |
| CN | 106157890 A | 11/2016 |
| CN | 205900069 U | 1/2017 |

OTHER PUBLICATIONS

First Office Action for Chinese Patent Application No. 201610670872.8—dated Oct. 27, 2017.

* cited by examiner

TEXTURE RECOGNITION DISPLAY DEVICE AND DRIVING METHOD THEREOF

CROSS REFERENCE TO RELATED APPLICATION

The present application is the U.S. national phase entry of PCT/CN2017/089999, with an international filling date of Jun. 26, 2017, which claims the priority benefits of the patent application 201610670872.8 submitted to the China Patent Office on Aug. 15, 2016, the whole disclosure of which is incorporated herein by reference.

TECHNICAL FIELD

The disclosure relates to the field of display technology, and in particular, to a texture recognition display device and a driving method thereof.

BACKGROUND

With the rapid development of display technologies, display panels with texture recognition function have already gradually pervaded people's lives. At present, in a texture recognition display device, photosensitive characteristics of PIN junctions may be utilized to achieve optical texture recognition function. However, for an existing texture recognition display device, the precision of texture recognition signal and the detection accuracy of texture recognition still need to be improved.

SUMMARY

In view of this, embodiments of the disclosure provide a texture recognition display device and a driving method, so as to improve precision in texture recognition signal extraction and detection accuracy in texture recognition.

Therefore, an embodiment of the disclosure provides a texture recognition display device comprising: a plurality of pixel circuits arranged in an array on a substrate, a plurality of first control signal lines, each of the first control signal lines being electrically connected with a row of pixel circuits, a plurality of second control signal lines, each of the second control signal lines being paired with one of the first control signal lines, and a plurality of recognition output lines along a column direction for reading a texture recognition signal. The first control signal line is coupled to a pixel circuit and is configured to provide a first control signal to the pixel circuit during a texture recognition period, the second control signal line is used for receiving a second control signal during the texture recognition period, the second control signal and the first control signal have a same frequency, and phases differing by 180 degrees.

In some embodiments, the plurality of first control signal lines and the plurality of second control signal lines comprise a pair of first control signal line and second control signal line disposed in a same gap between pixel circuit rows.

In some embodiments, extension directions of the first control signal line and the second control signal line disposed in pairs are substantially identical. It should be noted that, in practice, the extension directions of the first control signal line and the second control signal line disposed in pairs may intersect each other to form a certain angle less than 5°.

Further, in some embodiments, the first control signal line and the second control signal line disposed in pairs are parallel to each other.

Further, in some embodiments, the first control signal line and the second control signal line are disposed in the same layer, and the first control signal line and the second control signal line have a same line width.

In some embodiments, the texture recognition display device further comprises an integrated driver circuit, which is at least used for providing the first control signal and the second control signal to the first control signal lines and the second control signal lines during the texture recognition period, respectively.

In some embodiments, one end of the second control signal line is electrically connected with the integrated driver circuit, and the other end thereof is floating.

In some embodiments, the integrated driver circuit comprises a first sub-driver circuit electrically connected with the first control signal line to provide the first control signal; and a second sub-driver circuit electrically connected with the second control signal line to provide the second control signal.

Further, each of the first sub-driver circuit and the second sub-driver circuit comprises a front-end circuit for controlling a potential of a first node, and a back-end circuit for generating an output signal under control of the potential of the first node, and the front-end circuit and the back-end circuit are controlled such that a level of the potential of the first node is opposite to that of the potential of the output signal in a display period of time.

Further, in some embodiments, circuit structures of the first sub-driver circuit and the second sub-driver circuit are substantially identical, the back-end circuit has a first reference signal input terminal, and during the texture recognition period, the first reference signal input terminal in the first sub-driver circuit and the first reference signal input terminal in the second sub-driver circuit receive square wave signals with the same frequency, the same amplitude and phases differing by 180 degrees, respectively.

Further, in some embodiments, the first sub-driver circuit and the second sub-driver circuit electrically connected with the first control signal line and the second control signal line disposed in pairs, respectively, share a front-end circuit.

Alternatively, in some embodiments, the integrated driver circuit comprises a sub-driver circuit electrically connected with the first control signal line to provide the first control signal; and an inverter electrically connected with the second control signal line to provide the second control signal, the input terminal of the inverter being connected with the output terminal of the sub-driver circuit.

Further, in some embodiments, the sub-driver circuit comprises a front-end circuit for controlling the potential of a first node, and a back-end circuit for generating an output signal under control of the potential of the first node, and the front-end circuit and the back-end circuit are controlled such that the level of the potential of the first node is opposite to that of the potential of the output signal in a display period of time.

Further, in some embodiments, the texture recognition display device further comprises a plurality of photosensitive sensing units in an array, and each of the recognition output lines is electrically connected with a column of photosensitive sensing units to read the texture recognition signal.

In another aspect, an embodiment of the disclosure further provides a driving method for a texture recognition display device as described in any of the embodiments, comprising:

during the texture recognition period, providing, via the first control signal lines, the first control signal to pixel circuits electrically connected with the first control signal lines, and providing the second control signal to the second control signal lines; the second control signal and the first control signal having the same frequency, and phases differing by 180 degrees.

DETAILED DESCRIPTION OF EMBODIMENTS

In the following, specific implementations of a texture recognition display device and a driving method provided by embodiments of the disclosure will be described in detail in conjunction with the drawings.

In order to clearly understand the technical solutions proposed by the embodiments of the disclosure, a brief description with respect to the related structure and components of a texture recognition display device as described in an embodiment of the disclosure will be given first.

Figure 1:
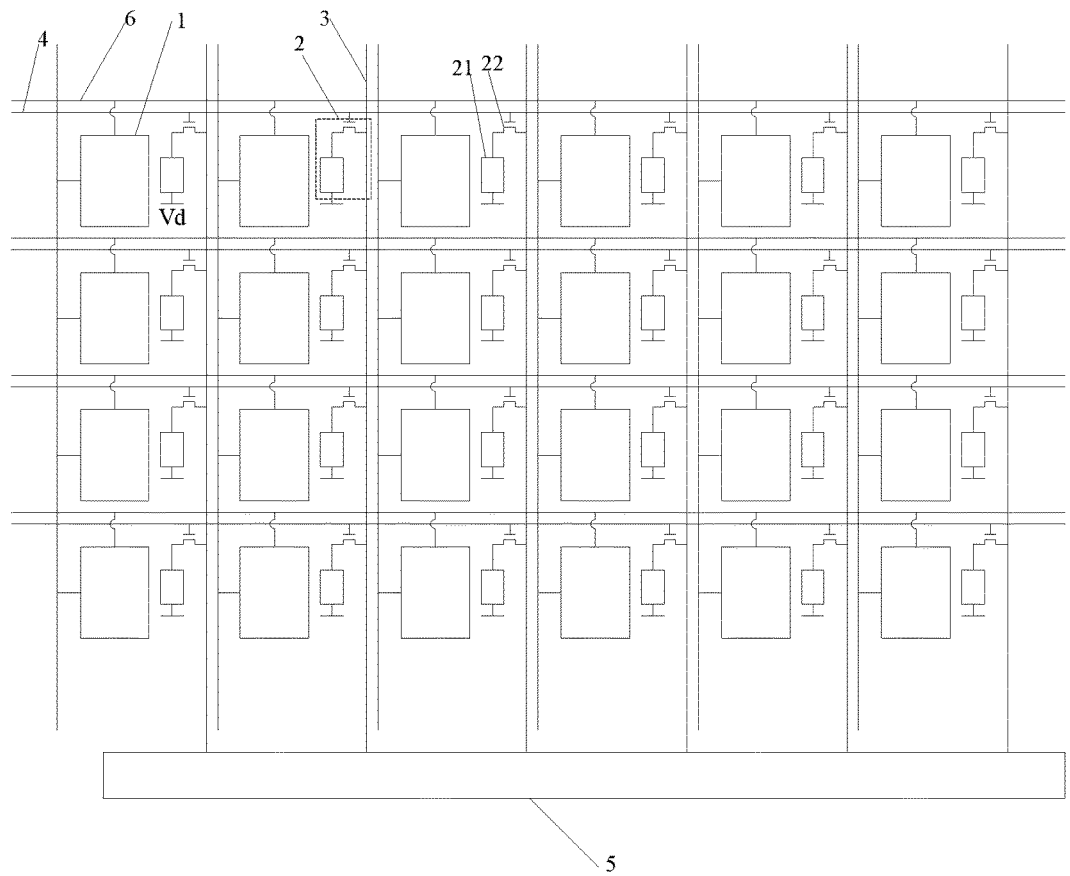
FIG. 1 schematically shows some components of a texture recognition display device provided by an embodiment of the disclosure.

As shown in FIG. 1, the texture recognition display device comprises a plurality of photosensitive sensing units 2, which may receive light reflected by an object containing a texture and generate a photocurrent. Taking a finger as an example, since the intensities of the light reflected by the valley and ridge of a fingerprint are different, the generated photocurrents will also be different, in this way, the valley and ridge of the fingerprint of the finger may be recognized accordingly.

The photosensitive sensing unit 2 comprises a photosensitive diode 21 for sensing the change in light intensity caused by the press of the object containing a texture, and a control transistor 22 for controlling the photosensitive diode 21 to convert the change in light intensity into an electrical signal to be outputted. The drain of the control transistor 22 may be electrically connected with a terminal of the photosensitive diode 21, its source is electrically connected with a recognition output line 3 along the column direction, and its gate is electrically connected with a scanning signal line 4. Because of the difference between the valley and the ridge of an object containing a texture such as a finger, different light reflections will occur when light impinges on the finger, thereby the photosensitive diodes 21 will receive light with different intensities and different photocurrents will be generated. Utilizing the scanning signal line 4 to turn on the control transistors 22, photocurrents from the photosensitive diodes 21 are successively read by the recognition output line 3 and exported to a detection circuit 5, thus detection of the valley and the ridge of an object containing a texture may be carried out. Since the photosensitive diode 21 usually operates in a reverse bias state, the other terminal of the photosensitive diode 21 is connected to a fixed potential Vd.

Figure 2:
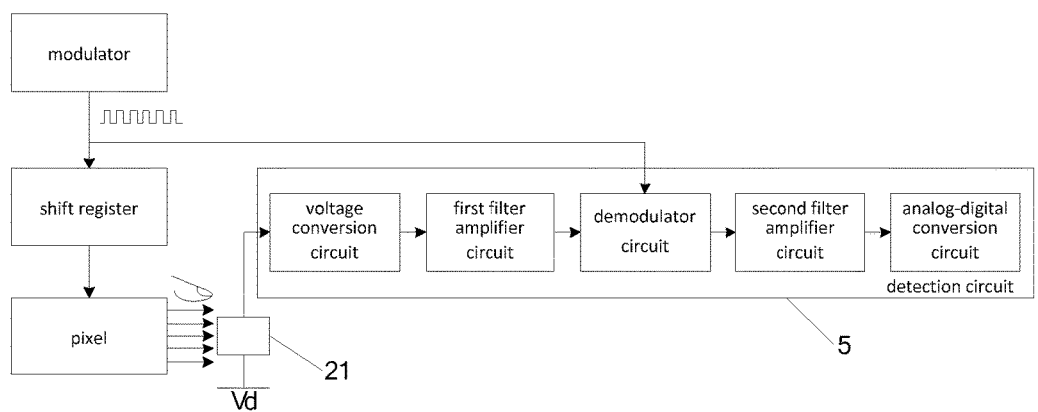
FIG. 2 illustrates an amplitude modulation technique applicable in the texture recognition display device provided by an example according to the disclosure.

While the photosensitive diode 21 receives light reflected by the fingerprint of a finger and generates a photocurrent, the ambient light may also impinge onto the photosensitive diode 21 through different paths so that noise may be generated, which may cause the texture recognition signal is difficult to be identified. In view of this, the amplitude modulation technique may be utilized to cause the texture recognition display device to emit modulated light during a texture recognition period for the display device, and the modulated light is reflected to the photosensitive diode 21 after impinging onto a texture structure. As shown in FIG. 2, during the texture recognition period, a modulator generates a square wave signal with a fixed frequency, and the square wave signal is transmitted via two paths, the square wave signal on one path is used for driving a pixel to emit light, thus generating the modulated light, and the other is used for demodulation of the texture recognition signal. When the finger presses the texture recognition display device, the modulated light will irradiate the finger and be reflected, and the reflected modulated light will impinge on the photosensitive diode 21 to generate a photocurrent. The photocurrent firstly enters a voltage conversion circuit for converting the photocurrent signal into a photo-voltage signal, then passes a first filter amplifier circuit, and afterwards, enters a demodulation circuit for demodulation. When demodulating the texture recognition signal, the signal from the modulator is required. After demodulated by the demodulation circuit, the texture recognition signal passes a second filter circuit with the low-pass filtering function for low-pass filtering, thus an extracted signal (which is an analog signal) indicative of the texture structure can be obtained. An analog-digital conversion circuit converts the analog signal into a digital signal, which is eventually outputted to a processor in a controller for processing, so as to obtain an image of the texture structure. With the modulated light during the texture recognition period, interferences from external light, ambient noise and electrical noise can be suppressed, and the signal-to-noise ratio can be improved.

It can be appreciated that the texture recognition signal mentioned herein is actually an electrical signal, in some embodiments, it can be in the form of current signal or voltage signal.

Further, inventors of this application have recognized that, it is difficult to remove noises with the same frequency and the same phase during the demodulation to the texture recognition signal in case of using the modulated light, therefore, it is necessary to further effectively reduce or eliminate noise interferences on the recognition output line and further improve the signal-to-noise ratio of the obtained texture recognition signal, thereby guaranteeing the detection precision of texture recognition.

Figure 3:
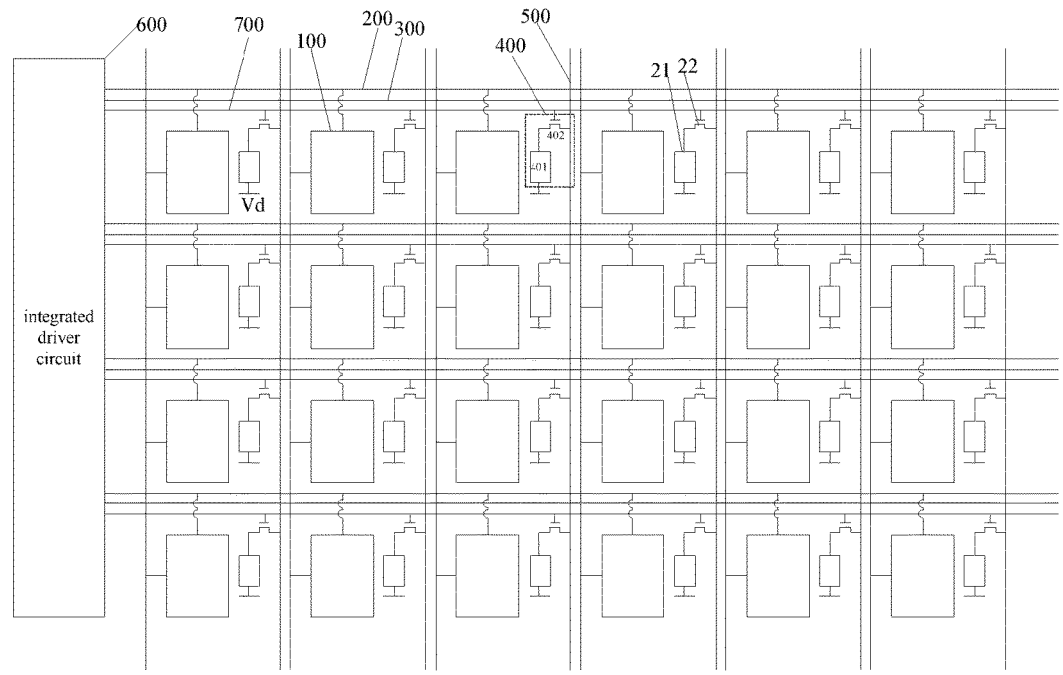
FIG. 3 is a structural diagram of a texture recognition display device provided by a further embodiment of the disclosure.

An embodiment of the disclosure provides a texture recognition display device, as shown in FIG. 3, comprising a plurality of pixel circuits 100 in an array on a substrate, a plurality of first control signal lines 200, each of the first control signal lines 200 being electrically connected with a row of pixel circuits, and a plurality of second control signal lines 300, each of the second control signal lines 300 being paired with one of the first control signal lines 200.

The first control signal line 200 is used for receiving a first control signal during a texture recognition period, to modulate the light emission of a pixel in the texture recognition display device via a pixel circuit 100, the second control signal line 300 is used for receiving a second control signal during the texture recognition period, the second control signal and the first control signal have the same signal frequency, and phases differing by 180 degrees.

As compared to the example of the texture recognition display device as shown in FIG. 1, in the example of the texture recognition display device as shown in FIG. 3, the plurality of second control signal lines 300 paired with the first control signal lines 200 are added, moreover, during the texture recognition period, the second control signal is loaded to the second control signal line 300, whose frequency is the same as the first control signal to the first control signal line 200 and whose phase differs from the phase of the first control signal by 180 degrees. In this way, the noise interference by the first control signal of the first control signal line 200 with the recognition output line 500 can be counteracted, and the signal-to-noise ratio of the obtained texture recognition signal can be improved, thereby further improving the precision and the detection precision of the texture recognition signal.

As shown in FIG. 3, the texture recognition display device may further comprise a plurality of photosensitive sensing units 400 in an array, a plurality of recognition output lines 500 arranged along the column direction and electrically connected with respective columns of photosensitive sensing units 400, and an integrated driver circuit 600 electrically connected with the first control signal lines 200 and the second control signal lines 300, respectively. The first control signal line 200 and second control signal line 300 arranged in pairs extend in the same direction, and the second control signal lines 300 may be connected only with the integrated driver circuit 600, that is, there is no connection relationship between the second control signal lines 300 and other elements in the texture recognition display device. During the texture recognition period, the integrated driver circuit 600 may, via the first control signal lines 200, provide a first control signal to the pixel circuits 100, and at the same time, provide a second control signal to the second control signal lines 300. The second control signal and the first control signal have the same signal frequency, and phases differing by 180 degrees.

In an embodiment, to reduce or avoid the influence on the pixel aperture ratio, as shown in FIG. 3, the photosensitive sensing units 400 are disposed at positions corresponding to gaps between pixel circuits 100, that is, the photosensitive sensing units 400 are disposed at positions corresponding to non-display regions. Moreover, FIG. 3 just shows an example in which at each gap between the pixel circuits 100 are disposed photosensitive sensing units 400. However, in practice, the distribution of the photosensitive sensing units 400 and the distribution of the pixel circuits 100 are not limited thereto.

In a texture recognition display device provided by an embodiment of the disclosure, as shown in FIG. 3, the photosensitive sensing unit 400 comprises a photosensitive diode 401 for sensing the change in light intensity resulting from a press by a fingerprint or palm-print, and a control transistor 402 for controlling the photosensitive diode 401 to convert the change in light intensity into an electrical signal. One of the drain and the source of the control transistor 402 may be electrically connected with a terminal of the photosensitive diode 401, the other may be electrically connected with the recognition output line 500, and the gate is electrically connected with a scanning signal line 700. When the scanning signal line 700 is loaded with a scanning signal, the control transistor 402 is in an ON state, such that the recognition output line 500 is electrically connected with the photosensitive diode 401. Taking a fingerprint as an example, because of the difference between the valley and the ridge of the fingerprint, different light reflections will be produced when the light impinges on the finger, thereby causing the intensities of light received by the photosensitive diode 401 to be different and generating different photocurrents. Turning on the control transistors 402 by means of the scanning signal line 700, the recognition output line 500 may successively read a signal indicate of the current from the photosensitive diode 401 and export it to a detection circuit, thus, detection of the valley and the ridge of the fingerprint may be carried out. Since the photosensitive diode 401 usually operates in a reverse bias state, the other terminal of the photosensitive diode 401 is electrically connected with a fixed potential Vd.

In some embodiments, in the texture recognition display device, the first control signal line 200 and the second control signal line 300 disposed in pairs are arranged to be as close to each other as possible, such that the second control signal loaded to the second control signal line 300 counteracts the noise interference of the first control signal on the first control signal line 200 with the recognition output line 500 as much as possible. In this case, as shown in FIG. 3, the pair of first control signal line 200 and the second control signal line 300 may be disposed in a gap between adjacent pixel circuit rows (that is, the pair of the first control signal line 200 and the second control signal line 300 are disposed in the same pixel circuit row gap). Of course, in other embodiments, it is not so limited. For example, in case the distribution density of the photosensitive sensing units 400 is less than that of the pixel circuits 100 (e.g., the photosensitive sensing units 400 are arranged every other pixel circuit row), the first control signal line 200 and second control signal line 300 in pair may be disposed in two different pixel circuit row gaps, respectively.

Further, in practice, in a texture recognition display device provided by an embodiment of the disclosure, the first control signal line 200 and the second control signal line 300 disposed in pairs located in the same pixel circuit row gap may be parallel to each other.

Figure 4:
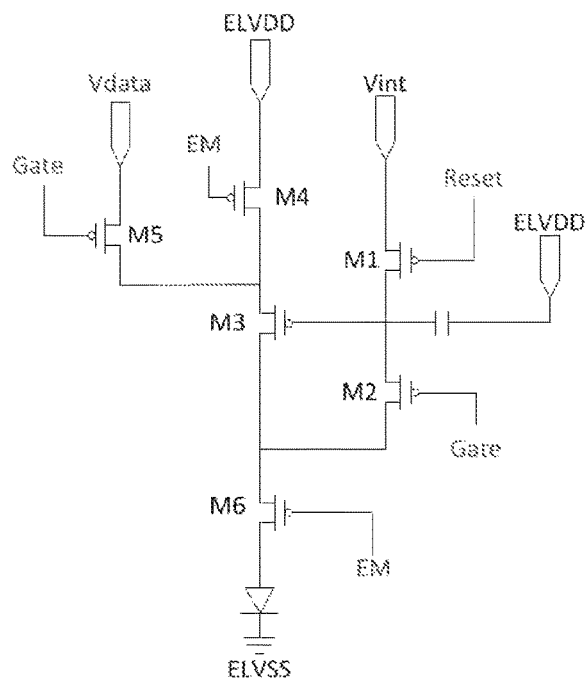
FIG. 4 is a structural diagram of an exemplary OLED pixel circuit.

In a texture recognition display device provided by an embodiment of the disclosure, the type of the pixel circuit 100 is not limited. For example, the pixel circuit 100 may be an OLED pixel circuit, for example, a pixel circuit as shown in FIG. 4. Alternatively, a liquid crystal display circuit may be employed. The liquid crystal display circuit herein comprises a switch transistor and a pixel electrode, as well as liquid crystal molecules and a common electrode corresponding to the pixel electrode, and in this case, the first control signal line is a gate signal line electrically connected with the gate of the switch transistor.

Figure 5:
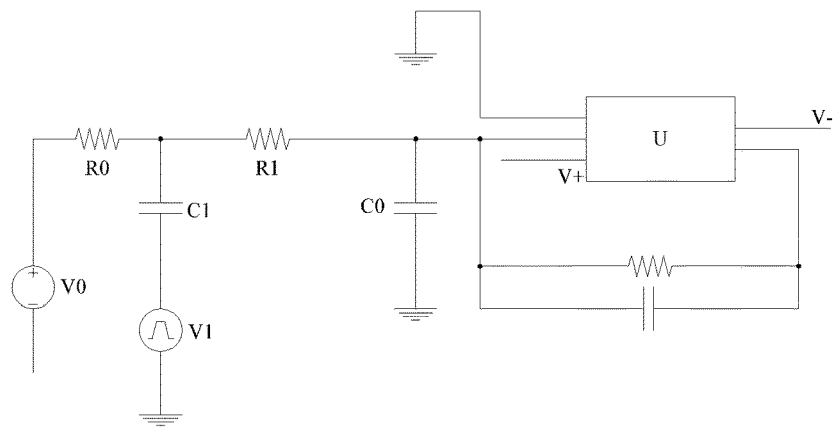
FIG. 5 is a diagram of an equivalent circuit model corresponding to a recognition output line in the texture recognition display device as shown in FIG. 1.
Figure 6:
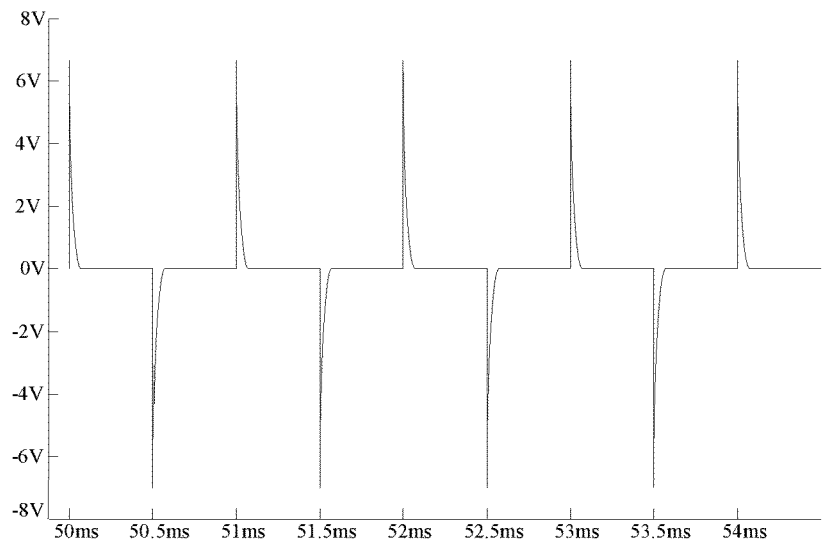
FIG. 6 is a chart of the simulation result of voltage of a signal outputted by the recognition output line corresponding to the circuit model as shown in FIG. 5.

FIG. 5 schematically shows an equivalent circuit model of a recognition output line in the texture recognition display device as shown in FIG. 1. It can be appreciated that there is an overlapping region between the orthographic projection of a recognition output line 3 electrically connected with photosensitive sensing units on the substrate and the orthographic projection of the first control signal line 6, in which a parasitic capacitance may be generated. The first control signal line 6 providing the first control signal may be equivalent to a square wave signal source V1, which is coupled to the recognition output line via the equivalent parasitic capacitance C1 between the first control signal line and the recognition output line. The photosensitive diode 21 may be equivalent to a signal source V0. The square wave signal source V1 will produce interference to a texture recognition signal outputted by the recognition output line. In FIG. 5, R0 is an equivalent resistance of the photosensitive diode 21 electrically connected with the recognition output line, R1 is an equivalent resistance of the recognition output line, C0 is an equivalent capacitance between the recognition output line and ground, and the capacitor and the resistor electrically connected with the operational amplifier U are a capacitor and a resistor required for transimpedance amplification. After performing signal simulation to this model, a simulation result of the relationship between the voltage of the signal outputted by the recognition output line and time is obtained as shown in FIG. 6. It can be seen from FIG. 6 that, for the signal outputted by the recognition output line after transimpedance amplification by the operational amplifier U, there exists interference with peak of approximately 8V, which is very unfavorable to the subsequent processing of the signal.

Figure 7:
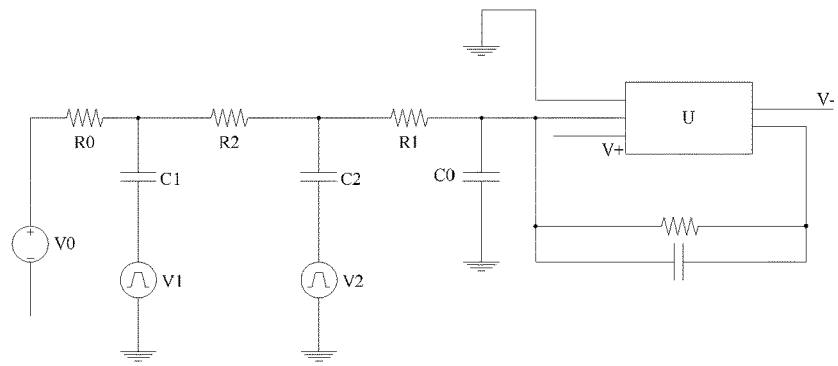
FIG. 7 is a diagram of an equivalent circuit model corresponding to a recognition output line in the texture recognition display device of the embodiment as shown in FIG. 3.
Figure 8:
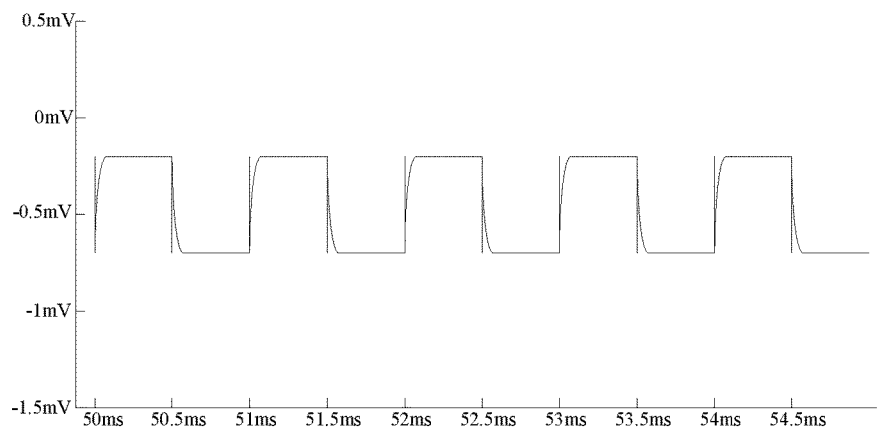
FIG. 8 is a chart of the simulation result of the voltage of a signal outputted by the recognition output line corresponding to the circuit model as shown in FIG. 7.

FIG. 7 schematically shows an equivalent circuit model corresponding to a recognition output line in the texture recognition display device as shown in FIG. 3. It can be appreciated that, the orthographic projection of a recognition output line 500 electrically connected with photosensitive sensing units 400 on the substrate will have an overlapping region with the orthographic projections of a pair of first control signal line 200 and second control signal line 300, respectively, in which a parasitic capacitance may be generated, respectively. In FIG. 7, the first control signal line is equivalent to a square wave signal source V1, which is coupled to the recognition output line via an equivalent parasitic capacitance C1 at the overlapping region of the first control signal line and the recognition output line. The photosensitive diode 401 is equivalent to a signal source V0, and the square wave signal source V1 produces interference to a texture recognition signal outputted by the recognition output line. A second control signal line for receiving the second control signal is equivalent to a square wave signal source V2, which is coupled to the recognition output line via the equivalent parasitic capacitance C2 at the overlapping region of the second control signal line and the recognition output line and applies interference to the texture recognition signal outputted by the recognition output line. Since the first control signal and the second control signal have the same signal frequency and phases differing by 180 degrees, the interference of the equivalent parasitic capacitance C1 and the equivalent parasitic capacitance C2 with the recognition output line may be mutually counteracted. In FIG. 7, R0 is an equivalent resistance of the photosensitive diode 401 electrically connected with the recognition output line, R1 is an equivalent resistance of the recognition output line, and R2 is a line resistance between the equivalent parasitic capacitor C1 and the equivalent parasitic capacitor C2. Since the first control signal line is very close to the second control signal line, the resistance R2 is very small and may be ignored. C0 is an equivalent capacitance between the recognition output line and ground, and the capacitor and the resistor electrically connected with the operational amplifier U are a capacitor and a resistor required for transimpedance amplification. After performing signal simulation to the model, a simulation result of the relationship between the voltage of the output signal on the recognition output line and time is obtained as shown in FIG. 8. It can be seen that the noise has already been reduced below 0.5 mV, and the interference signal is small and will not cause great influence on subsequent processing by the detection circuit.

Figure 9:
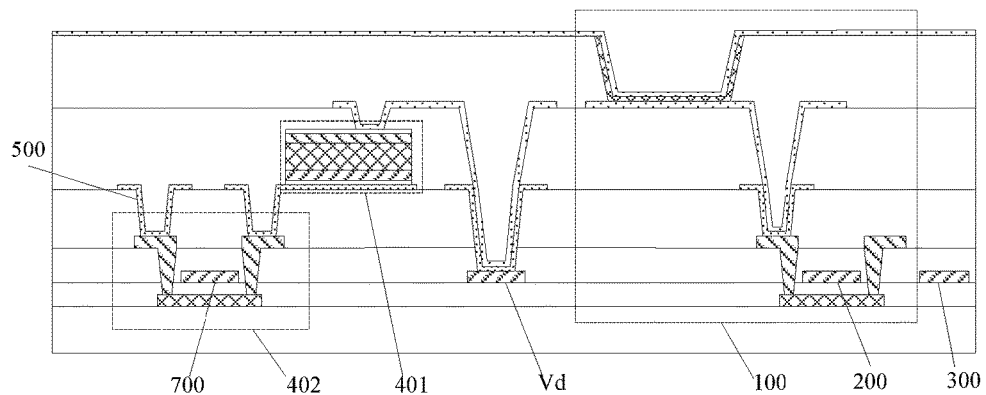
FIG. 9 is a sectional view of a pixel circuit in the texture recognition display device provided by an embodiment of the disclosure.

In some embodiments, in order to enable the second control signal loaded by the second control signal line 300 to counteract the noise interference by the first control signal of the first control signal line 200 with the recognition signal line 500 as much as possible, in a texture recognition display device provided by a further embodiment of the disclosure, as shown in FIG. 9, the first control signal line 200 and the second control signal line 300 are disposed in the same layer and in parallel to each other, and the first control signal line 200 and the second control signal line 300 have the same line width. In this embodiment, the first control signal line 200 and the second control signal line 300 may be fabricated by means of the same film process or the same photo process or the same exposure process.

In specific implementation, for the convenience of loading the second control signal to the second control signal line 300, in a texture recognition display device provided by an embodiment of the disclosure, as shown in FIG. 3, one end of the second control signal line 300 may be electrically connected with the integrated driver circuit 600, and the other end is floating. Alternatively, in a texture recognition display device driven on two sides, it may also be possible to connect the other end of the second control signal line 300 with another integrated driver circuit.

In the following, a specific structure of the integrated driver circuit will be illustrated by an example in which the pixel circuit 100 employs an OLED pixel circuit as shown in FIG. 4. A signal timing diagram corresponding to the terminals in the OLED pixel circuit shown in FIG. 4 is shown in FIG. 10, in which signals loaded to the reset signal terminal Reset, the scanning signal terminal Gate and the light emission control terminal EM are timing signals outputted by the integrated driver circuit, the reference potential of the reference signal terminal Vint, the potentials of the high level signal terminal ELVDD and the low level signal terminal ELVSS are provided by an external flexible printed circuit (FPC), and the data signal of the data signal terminal Vdata is provided by a source IC chip.

Figure 10:
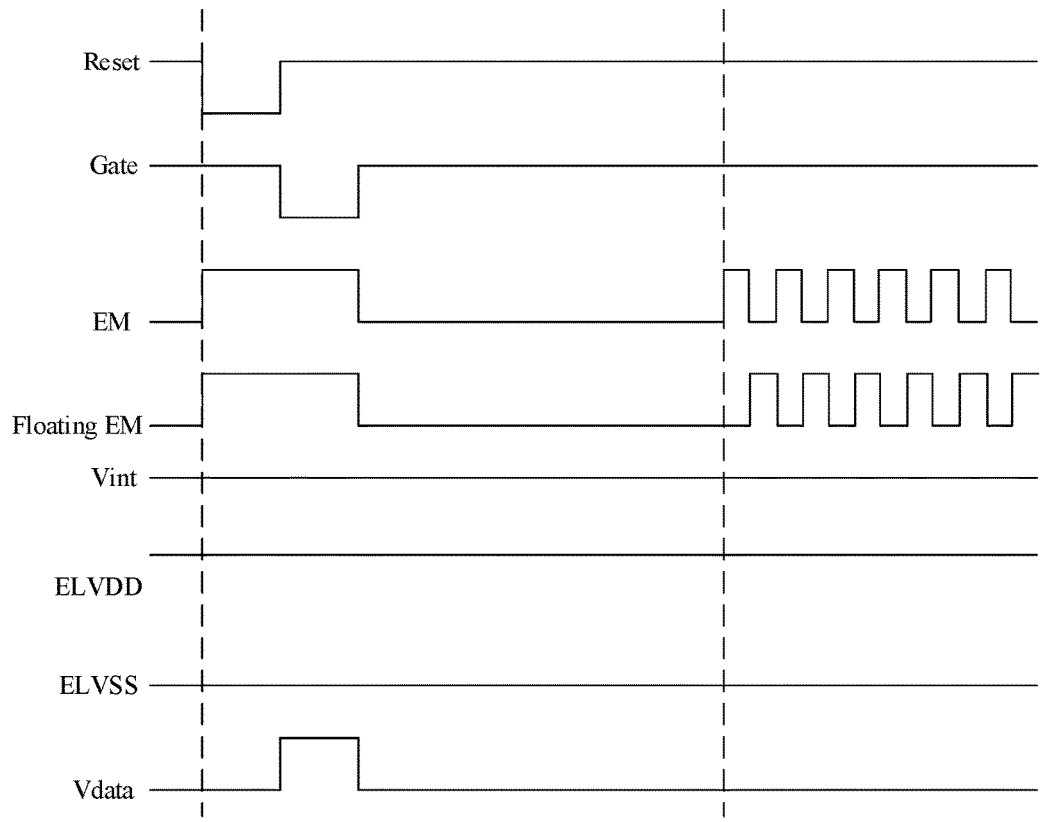
FIG. 10 is a signal timing diagram corresponding to the pixel circuit as described in FIG. 4 provided by an embodiment of the disclosure.

It can be seen from the signal timing diagram shown in FIG. 10 that, the timing for the texture recognition display device may comprise two time periods, i.e., a display period and a texture recognition period. During the display period, the OLED pixel circuit performs normal displaying function, and during the texture recognition period, the light emission control terminal EM receives a square wave signal as the first control signal. With the square wave signal, the texture recognition display device will emit modulated light under the control of the OLED pixel circuit. The second control signal loaded by the second control signal line Floating EM has no effect on the OLED pixel circuit, and it may reduce or eliminate the noise interference by the first control signal with the recognition output line 500 electrically connected with the photosensitive sensing unit during the texture recognition period.

The signal timing diagram shown in FIG. 10 is an example of time-sharing driving, which comprises the display period and the texture recognition period, but the embodiments of the disclosure will not be limited thereto. For example, in other embodiments, the light emission control terminal EM may receive the square wave signal (modulation signal) both in the display period and the texture recognition period. Alternatively, only when the texture recognition function is enabled, does the light emission control terminal EM receive the square wave signal, whereas in other situations, the texture recognition display device performs normal displaying function.

In specific implementation, in a texture recognition display device provided by an embodiment of the disclosure, since the integrated driver circuit 600 electrically connected with the first control signal lines 200 and the second control signal lines 300 respectively needs to provide the first control signal to the first control signal lines 200 during the texture recognition period, and at the same time, provide the second control signal to the second control signal lines 300, the integrated driver circuit 600 may comprise a first sub-driver circuit electrically connected with the first control signal lines 200 and a second sub-driver circuit electrically connected with the second control signal lines 300.

In specific implementation, since the functions of the first sub-driver circuit and the second sub-driver circuit are similar, the first sub-driver circuit and the second sub-driver circuit may employ the same or similar circuit structure.

Figure 11:
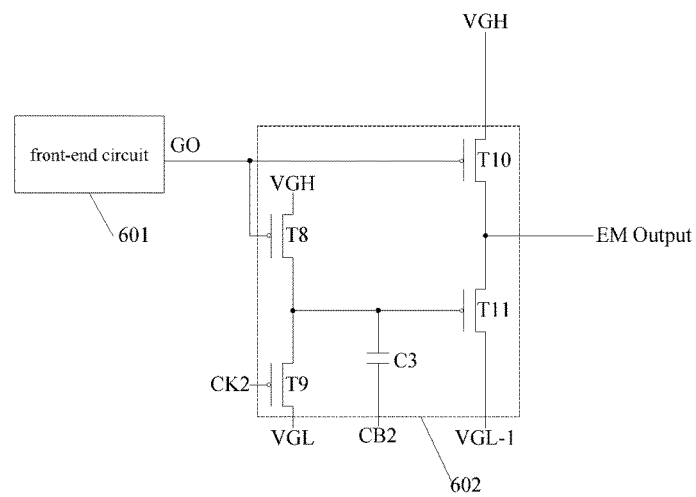
FIG. 11 is a structural diagram of a first sub-driver circuit or a second sub-driver circuit in an integrated driver circuit in the texture recognition display device provided by an embodiment of the disclosure.

In an embodiment, the structures of the first sub-driver circuit and the second sub-driver circuit are substantially identical. As shown in FIG. 11, the first sub-driver circuit or the second sub-driver circuit may comprise a front-end circuit 601 for controlling the potential of a first node GO, and a back-end circuit 602 for driving a signal output terminal to output a signal under the control of the potential of the first node GO. The front-end circuit 601 and the back-end circuit 602 are controlled such that the potential of the first node GO is opposite to that of the output signal during the display period. For example, in the display period, when the potential of the first node GO is at a high level, the output signal of the signal output terminal EM Output is at a low level; and when the potential of the first node GO is at the low level, the output signal of the signal output terminal EM Output is at the high level.

An example of the back-end circuit 602 in the first sub-driver circuit and the second sub-driver circuit is shown in FIG. 11, other circuit structures are also possible, which will not be limited herein.

Figure 12:
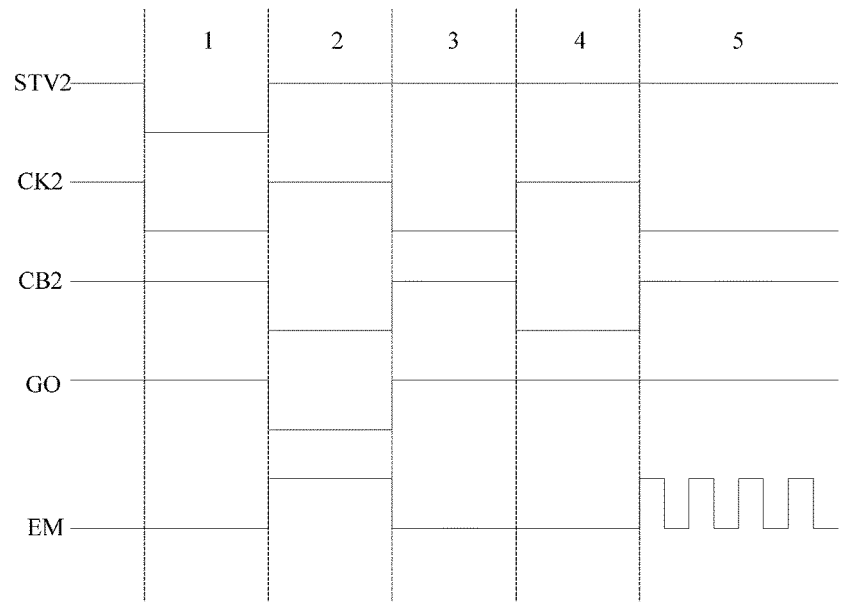
FIG. 12 is a signal timing diagram corresponding to the embodiment as shown in FIG. 11.

FIG. 12 shows a signal timing diagram corresponding to the first sub-driver circuit as shown in FIG. 11. In the following, the working principles of the circuit shown in FIG. 11 will be introduced in conjunction with FIG. 12.

Stage 1: the first node GO is at a high level, the switch transistors T8 and T10 are in an OFF state, and since the second clock signal terminal CK2 is at a low level, the switch transistors T9 and T11 are in an ON state, and a low level signal of the reference signal terminal VGL-1 is outputted from the signal output terminal EM Output of the first sub-driver circuit.

Stage 2: the first node GO is at a low level, the switch transistors T8 and T10 are in the ON state, and since the second clock signal terminal CK2 is at a high level, the switch transistors T9 and T11 are in the OFF state, and a high level signal of the reference signal terminal VGH is outputted from the signal output terminal EM Output of the first sub-driver circuit.

Stage 3: the first node GO is at a high level, the switch transistors T8 and T10 are in the OFF state, and since the second clock signal terminal CK2 is at the low level, the switch transistors T9 and T11 are in the ON state, and the low level signal of the reference signal terminal VGL-1 is outputted from the signal output terminal EM Output of the first sub-driver circuit.

Stage 4: the first node GO is at a high level, the switch transistors T8 and T10 are in the OFF state, and since the second clock signal terminal CK2 is at the high level, the switch transistor T9 are in the OFF state, and since the first clock signal terminal CB2 is at a low level, the switch transistor T11 remains in the ON state, and the low level signal of the reference signal terminal VGL-1 is outputted from the signal output terminal EM Output of the first sub-driver circuit.

Stage 5: the first node GO is at the high level, the switch transistors T8 and T10 are in the OFF state, and since the second clock signal terminal CK2 is at the low level, the switch transistors T9 and T11 are in the ON state, and the square wave signal of the reference signal terminal VGL-1 is outputted from the signal output terminal EM Output of the first sub-driver circuit.

The above stages 1-4 is corresponding to the display period, stage 5 corresponds to the texture recognition period, and the signal STV2 shown in FIG. 12 is a frame start signal.

Figure 13:
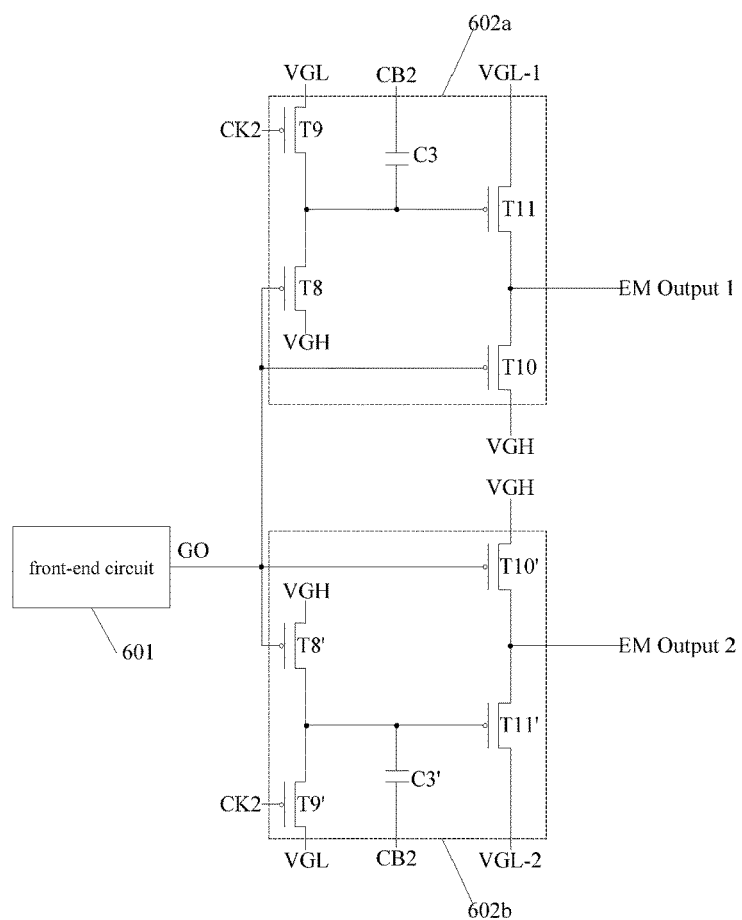
FIG. 13 illustrates a first sub-driver circuit and a second sub-driver circuit in an integrated driver circuit in the texture recognition display device provided by another embodiment of the disclosure.

In the above embodiment, the structures of the first sub-driver circuit and the second sub-driver circuit are substantially identical, and their difference lies in that, during the texture recognition period, the first reference signal input terminal VGL-1 of the first sub-driver circuit and the first reference signal input terminal VGL-1 of the second sub-driver circuit receive square wave signals with the same signal frequency, the same amplitude and phases differing by 180 degrees, respectively. That is, the working principles of the second sub-driver circuit and the first sub-driver circuit are substantially identical, and the difference lies in that the phases of the square wave signals received by the reference signal terminals VGL-1 during Stage 5 differ by 180 degrees. In another embodiment, the first sub-driver circuit and the second sub-driver circuit may share some circuits. As shown in FIG. 13, the first sub-driver circuit and the second sub-driver circuit respectively electrically connected with a first control signal line 200 and a second control signal line 300 disposed in pairs may share a front-end circuit 601, that is, the first sub-driver circuit and the second sub-driver circuit comprise one front-end circuit 601 and two back-end circuit 602a, 602b, the operation principle is similar to the embodiment shown in FIG. 11, the similarities will not be repeated here. The difference lies in that, during stage 5, the phase of the square wave signal received by the reference signal terminal VGL-1 of the back-end circuit 602a differs from that of the square wave signal received by the reference signal terminal VGL-2 of the back-end circuit 602b by 180 degrees.

Figure 14:
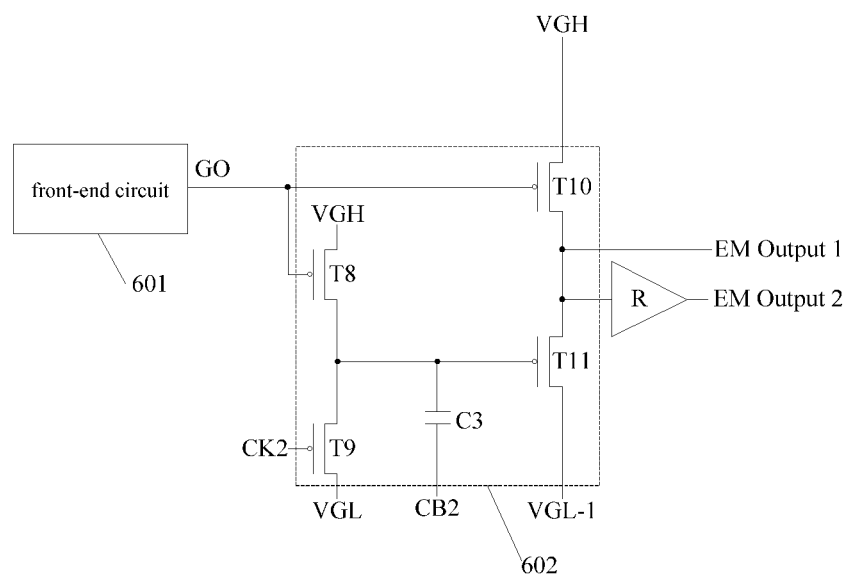
FIG. 14 is a schematic diagram of a first sub-driver circuit and a second sub-driver circuit in an integrated driver circuit in the texture recognition display device provided by still another embodiment of the disclosure.

In still another embodiment, the integrated driver circuit may comprise a sub-driver circuit electrically connected with the first control signal lines, and an inverter R electrically connected with the second control signal lines, the input terminal of the inverter being electrically connected with the output terminal of the sub-driver circuit. That is, in this embodiment, the first sub-driver circuit and the second sub-driver circuit respectively electrically connected with the first control signal lines and the second control signal lines may be replaced with one sub-driver circuit. FIG. 14 shows schematically a sub-driver circuit respectively electrically connected with a pair of first control signal line 200 and second control signal line 300. The signal output terminal EM Output 1 of the back-end circuit 602 of the sub-driver circuit is directly connected with the first control signal line and electrically connected with the input terminal of the inverter R, and the output terminal of the inverter R is electrically connected with the second control signal line. The working principles of the sub-driver circuit are similar to those of the circuit shown in FIG. 11, which will not be repeated herein.

As compared to the embodiment shown in FIG. 11, the circuits of the embodiments shown in FIG. 13 and FIG. 14 are much simpler, which may simplify the complexity of the integrated driver circuit and is favorable to narrowing the frame of the display device.

The texture recognition display device provided by the embodiments of the disclosure may be any product or component with the displaying function, such as a mobile phone, a tablet computer, a television, a display, a notebook computer, a digital photo frame, a navigator, etc., which will not be limited herein. The texture recognition display device provided by the embodiments of the disclosure may not only be used for fingerprint recognition or identification, but also for recognition of other objects with a texture feature.

Based on the same inventive concept, an embodiment of the disclosure further provides a driving method for a texture recognition display device as described above. The method comprises, during a texture recognition period, providing, via a first control signal line, a first control signal to pixel circuits electrically connected with the first control signal line, and providing a second control signal to a second control signal line, the second control signal and the first control signal having the same signal frequency, and phases differing by 180 degrees.

By utilizing the second control signal loaded by the second control signal line, of which the signal frequency is the same as that of the first control signal of the first control signal line and of which the phase differs by 180 degrees from that of the first control signal, the noise interference by the first control signal of the first control signal line with the recognition output line may be weakened or counteracted, thereby improving the signal-to-noise ratio of the obtained texture recognition signal, and further improving the precision of the extracted texture recognition signal and the detection precision.

For the texture recognition display device and the driving method provided by the embodiments of the disclosure, in the texture recognition display device are added a plurality of second control signal lines paired with the first control signal lines, the orthographic projection of a recognition output line electrically connected with photosensitive sensing units on the substrate will have an overlapping region with the orthographic projections of the first control signal line and the second control signal line on the substrate respectively, in which overlapping region a parasitic capacitance will be generated inevitably. During the texture recognition period, the second control signal line is utilized to load the second control signal, of which the signal frequency is the same as that of the first control signal and of which the phase differs by 180 degrees, thus, the noise interference of the first control signal of the first control signal line with the recognition output line can be weakened or counteracted, the signal-to-noise ratio of the obtained texture recognition signal can be improved, thereby guaranteeing a high precision in extraction of the texture recognition signal and the detection precision.

Clearly, various modifications and variations may be made to the disclosure by the skilled in the art without departing from the spirit and scope of the invention. As such, the invention is also intended to include these modifications and variations, if the modifications and variations of the disclosure pertain to the scope of the appended claims and the equivalence thereof.

The invention claimed is:

1. A texture recognition display device, comprising:
   a plurality of pixel circuits arranged in an array on a substrate,
   a plurality of first control signal lines, each of the first control signal lines being electrically connected with a row of pixel circuits,
   a plurality of second control signal lines, each of the second control signal lines being paired with one of the first control signal lines, and
   a plurality of recognition output lines along a column direction for reading a texture recognition signal,
   wherein the first control signal line is coupled to a pixel circuit and is configured to provide a first control signal to the pixel circuit during a texture recognition period, the second control signal line is used for receiving a second control signal during the texture recognition period, the second control signal and the first control signal have a same frequency, and phases differing by 180 degrees.

2. The texture recognition display device as claimed in claim 1, wherein the plurality of first control signal lines and the plurality of second control signal lines comprise a pair of first control signal line and second control signal line arranged in a same gap between pixel circuit rows.

3. The texture recognition display device as claimed in claim 1, wherein extension directions of the first control signal line and the second control signal line disposed in pairs are substantially identical.

4. The texture recognition display device as claimed in claim 3, wherein the first control signal line and the second control signal line disposed in pairs are parallel to each other.

5. The texture recognition display device as claimed in claim 4, wherein the first control signal line and the second control signal line are disposed in a same layer, and the first control signal line and the second control signal line have a same line width.

6. The texture recognition display device as claimed in claim 1, wherein the texture recognition display device further comprises an integrated driver circuit, which is at least used for providing the first control signal and the second control signal to the first control signal line and the second control signal line during the texture recognition period, respectively.

7. The texture recognition display device as claimed in claim 6, wherein one end of the second control signal line is electrically connected with the integrated driver circuit, and the other end thereof is floating.

8. The texture recognition display device as claimed in claim 7, wherein the integrated driver circuit comprises a first sub-driver circuit electrically connected with the first control signal line for providing the first control signal, and a second sub-driver circuit electrically connected with the second control signal line for providing the second control signal.

9. The texture recognition display device as claimed in claim 8, wherein each of the first sub-driver circuit and the second sub-driver circuit comprises a front-end circuit for controlling a potential of a first node, and a back-end circuit for generating an output signal under control of the potential of the first node, wherein a level of the potential of the first node is opposite to that of a potential of the output signal during a display period.

10. The texture recognition display device as claimed in claim 9, wherein circuit structures of the first sub-driver circuit and the second sub-driver circuit are substantially identical, wherein the back-end circuit has a first reference signal input terminal, and during the texture recognition period, the first reference signal input terminal in the first sub-driver circuit and the first reference signal input terminal in the second sub-driver circuit receive square wave signals with a same frequency, a same amplitude and phases differing by 180 degrees, respectively.

11. The texture recognition display device as claimed in claim 10, wherein the first sub-driver circuit and the second sub-driver circuit respectively electrically connected with the first control signal line and the second control signal line disposed in pairs share a front-end circuit.

12. The texture recognition display device as claimed in claim 7, wherein the integrated driver circuit comprises a sub-driver circuit electrically connected with the first control signal line to provide the first control signal, and an inverter, an input terminal of the inverter is electrically connected with an output terminal of the sub-driver circuit, an output terminal of the inverter is electrically connected with the second control signal line to provide the second control signal.

13. The texture recognition display device as claimed in claim 12, wherein the sub-driver circuit comprises a front-end circuit for controlling a potential of a first node, and a back-end circuit for generating an output signal under control of the potential of the first node, and wherein a level of the potential of the first node is opposite to that of a potential of the output signal during a display period.

14. The texture recognition display device as claimed in claim 1, further comprising:
   a plurality of photosensitive sensing units in an array, the plurality of photosensitive sensing units are configured to convert a light intensity to the texture recognition signal;
   wherein each of the recognition output lines is electrically connected with a column of photosensitive sensing units.

15. A driving method for a texture recognition display device as claimed in claim 1, comprising:
   during the texture recognition period, providing, via the first control signal lines, the first control signal to pixel circuits electrically connected with the first control signal lines, and providing the second control signal to the second control signal lines, the second control signal and the first control signal having the same frequency, and phases differing by 180 degrees.

* * * * *